Jan. 14, 1936.   R. R. ERBE   2,027,523
GLUING MACHINE
Filed May 26, 1934   4 Sheets-Sheet 1

INVENTOR.
RALPH R. ERBE

Lockwood Goldsmith & Gaet
ATTORNEYS.

Jan. 14, 1936.  R. R. ERBE  2,027,523
GLUING MACHINE
Filed May 26, 1934  4 Sheets-Sheet 4

INVENTOR.
RALPH R. ERBE.
BY Lockwood Goldsmith & Galt
ATTORNEYS.

Patented Jan. 14, 1936

2,027,523

UNITED STATES PATENT OFFICE 2,027,523

GLUING MACHINE

Ralph R. Erbe, Fort Wayne, Ind., assignor to The Capehart Corporation, Fort Wayne, Ind., a corporation Application May 26, 1934, Serial No. 727,777

13 Claims. (Cl. 91—50)

This invention relates to swatch gluing apparatus.

In preparing samples of dress goods and other fabrics for distribution to salesmen and purchasers, the samples or "swatches" are fixed upon sheets of cardboard or heavy paper, preferably by means of paste or glue. In preparing a large number of samples, this has heretofore required a large amount of manual labor, especially in the application of the glue. In the present invention, spots of paste or glue are supplied by a gluing machine to the pasteboard or paper sheets in the proper position for each size and shape of sample, thus eliminating this part of the manual labor. The only manual labor required is to attach the swatches to the sheets by pressing them against the proper glue spots. The machine is so designed that a large number of sheets may be run through in a short time and each sheet will have the glue spots placed thereon in exactly the proper position. The sheets with the glue thereon are delivered to a conveyor from which they may be removed singly by operators who quickly affix the swatches thereto.

The principal object of the invention is generally to improve upon apparatus of this type.

One feature of the invention resides in the use of a rotating, off-bearing conveyor or receiving table and the provision of means for controlling the operation of the machine to deliver sheets to the off-bearing conveyor only when there are vacant places for said sheets on the conveyor. Thus, the operation of the machine is made to conform to the speed of the operators in removing sheets from the conveyor and attaching swatches thereto.

Another feature of the invention resides in the means provided for backing up the sheets during the deposition of glue thereon and for controlling the movement of said backing up means to prevent deposition of glue thereon when no sheet is passing through.

Another feature of the invention resides in the means provided for mounting and adjusting the glue pot to supply a desired thickness of glue film to the sheets.

Another feature resides in the arrangement of stop devices used to control the feeding of sheets to the machine.

Other objects and features of the invention will be understood from the following specification and claims and the accompanying drawings:

The embodiment of the gluing machine illustrated in the drawings is of the general type in which the sheets are successively fed beneath a rotating drum 15 carrying projecting pins 16 which engage the sheets and deposit thereon a number of spots of glue in the proper position for the size of swatch to be attached thereto. The pins are removably set in threaded holes in the drum and a sufficient number of said holes are provided for a variety of sizes of cards and swatches. A glue pot 17 is mounted on the machine and a glue roller 18 revolves therein to carry a film of glue from the pot and deposit the same on the tips of the pins 16. The feeding of sheets beneath the drum is mechanically controlled in timed relation with the rotation of the drum to insure that the glue spots are placed thereon at the proper positions. The sheets are fed from the gluing machine onto a continuously rotating off-bearing conveyor or table 19 and mechanism is provided which prevents delivery of a sheet from the machine unless there is a vacant space on the table in position to receive the same. The sheets are removed from the table by operators seated about the same and the swatches are manually attached thereto by said operators.

A detailed description of the embodiment of the invention illustrated in the drawings follows:

Frame of gluing machine

The stationary frame of the gluing machine consists of a base plate 20, a pair of side plates 21 and 22, and a deck plate 23 supported upon the side plates 21 and 22. The two side plates are stabilized by means of a tie rod 24.

Drum mounting and drive

The drum 15 is provided with a central shaft 25 one end of which is supported within a hub 26 formed integrally with a stub shaft 27 mounted in a suitable bearing on the side plate 21. A collar 28 surrounds the hub 26 and is adjustably secured thereto by a set screw 29. One or more pins 30 are secured in the collar 28 and project into suitable holes provided in the hub 31 of the drum.

The opposite end of the drum 15 is supported upon a ball bearing 32 which is carried by a stud 33 mounted upon the side plate 22. The said stud is secured in place by a set screw 34 and may be withdrawn for removal of the drum when said screw is loosened. When the stud 33 has been withdrawn the drum may be moved longitudinally to free the shaft 25 from the hub 26 and the pins 30 from the hub 31. In removing the drum in this manner the adjusted position of the collar 28 upon the hub 26 is not disturbed so that the drum may be replaced in the original angular relation to shaft 27 without readjustment.

A motor 35 mounted on an extension 36 of the base plate 20 continuously drives the drum 15 through power transmission apparatus consisting of pulley 37, belt 38, pulley 39, cone pulley 40, belt 41, cone pulley 42, pinion 43, gear 44, pinion 45, gear 46, gear 47 and gear 48, the last-mentioned gear being mounted upon the stub shaft 27. Each of the said gears and pulleys is mounted on a shaft or stud suitably supported on one or both of the side plates 21 and 22, with the exception of pulley 37 which is mounted on the shaft of motor 35.

*Glue pot mounting and drive*

The glue pot 17 is in the form of an open trough extending transversely across the machine. At each of the lower corners of the pot there is formed a tongue 49. The said tongues are slidably supported in guideways between flanges 50 which are formed integrally with the side plates 21 and 22. By this construction the glue pot may be slid toward or away from the drum 15.

A pair of lugs 51 are formed on the inner surfaces of the side plates 21 and 22 and each carries an adjusting screw 52 positioned to engage a corner of one of the tongues 49. A pair of lock screws 53 are threadedly engaged with the side plates 21 and 22 and are provided with slots 54 in their heads, said slots being of the proper size to permit passage therethrough of the tongues 49.

The glue roller 18 is mounted on a shaft 55 suitably journaled upon the end walls of the glue pot 17 and carrying at its outer end a gear 56. The said gear and the roller 18 are rotated by a gear train consisting of gears 57 and 58, the latter gear meshing with the continuously rotating gear 48.

Within the glue pot there is provided a spreader 59 in the form of a yoke pivotally mounted on pivot pins 60 on the opposite end walls of the said pot and extending across the full length of the roller 18. The spreader 59 is provided with a handle 61 to which there is attached a tension spring 62 the opposite end of which is attached to a pin 63 mounted upon the rear wall of the glue pot 17. An adjusting screw 64 threadedly engages said rear wall and the top thereof engages the spreader 59 to limit the travel thereof under the influence of the spring 62.

In the assembly of the glue pot, the lock screws 53 are rotated until the slots 54 therein are in alignment with the guideways between the flanges 50. The glue pot may then be slid into place against the adjusting screws 52. The said screws are adjusted to provide a slight clearance between the glue roller 18 and the pins 16 sufficient for the deposition on the said pins of the desired thickness of glue film. The lock screws 53 are then rotated until the heads thereof engage the glue pot and press it firmly against the adjusting screws 52. The adjusting screw 64 is adjusted to give a clearance between the spreader 59 and the glue roller 18 sufficient to insure that the desired thickness of glue film is uniformly spread on the said roller. For removal of the glue pot for cleaning or other purposes, it is only necessary to rotate the screws 53 until the slots 54 in their heads are in position to permit passage of the tongues 49. The pot may then be withdrawn and can then be replaced without the necessity of further adjustment since the position of the adjusting screws 52 is not disturbed in the removal and replacement.

*Sheet guiding and feeding mechanism*

Figure 1:
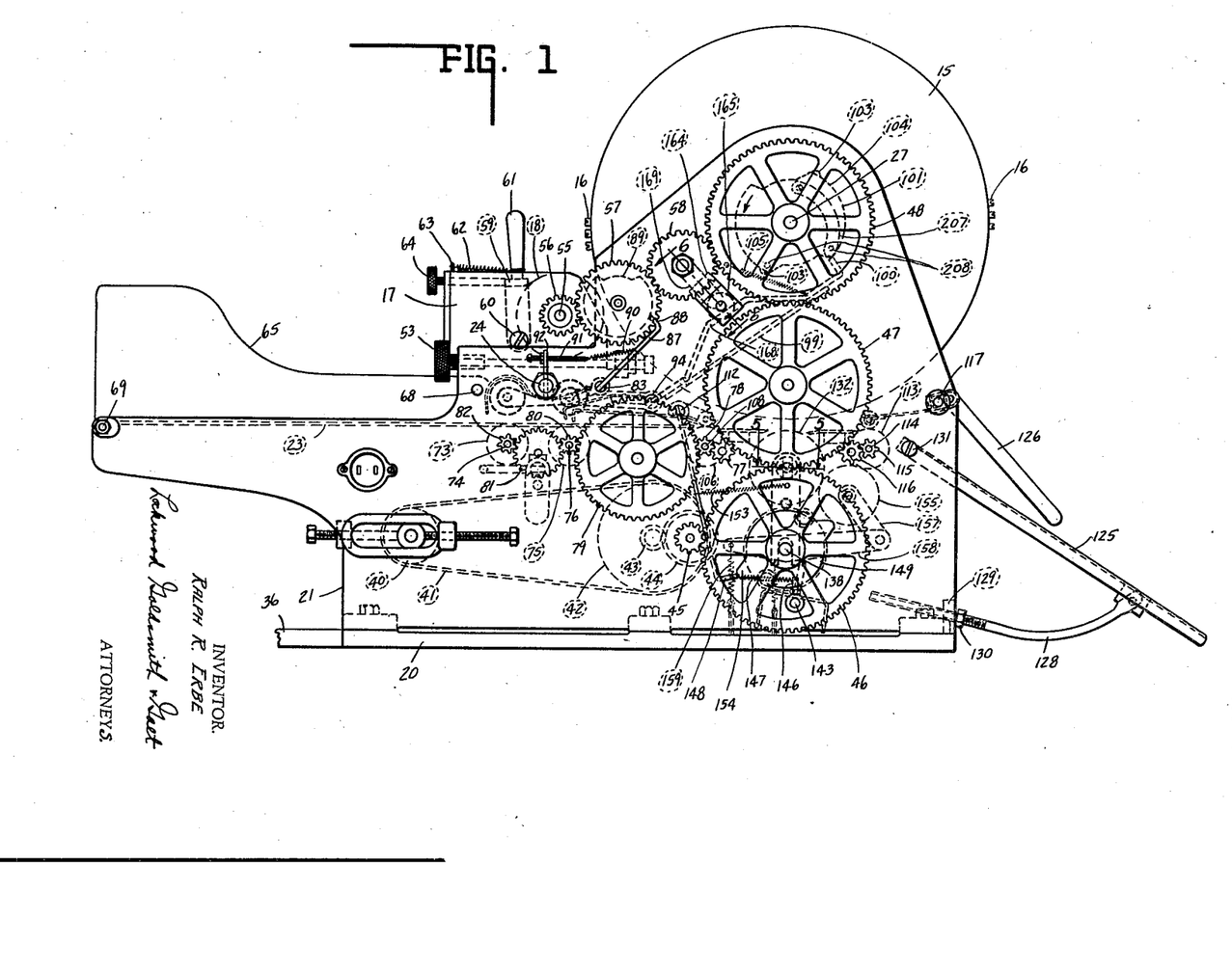
Fig. 1 is a side elevational view of the gluing machine.
Figure 2:
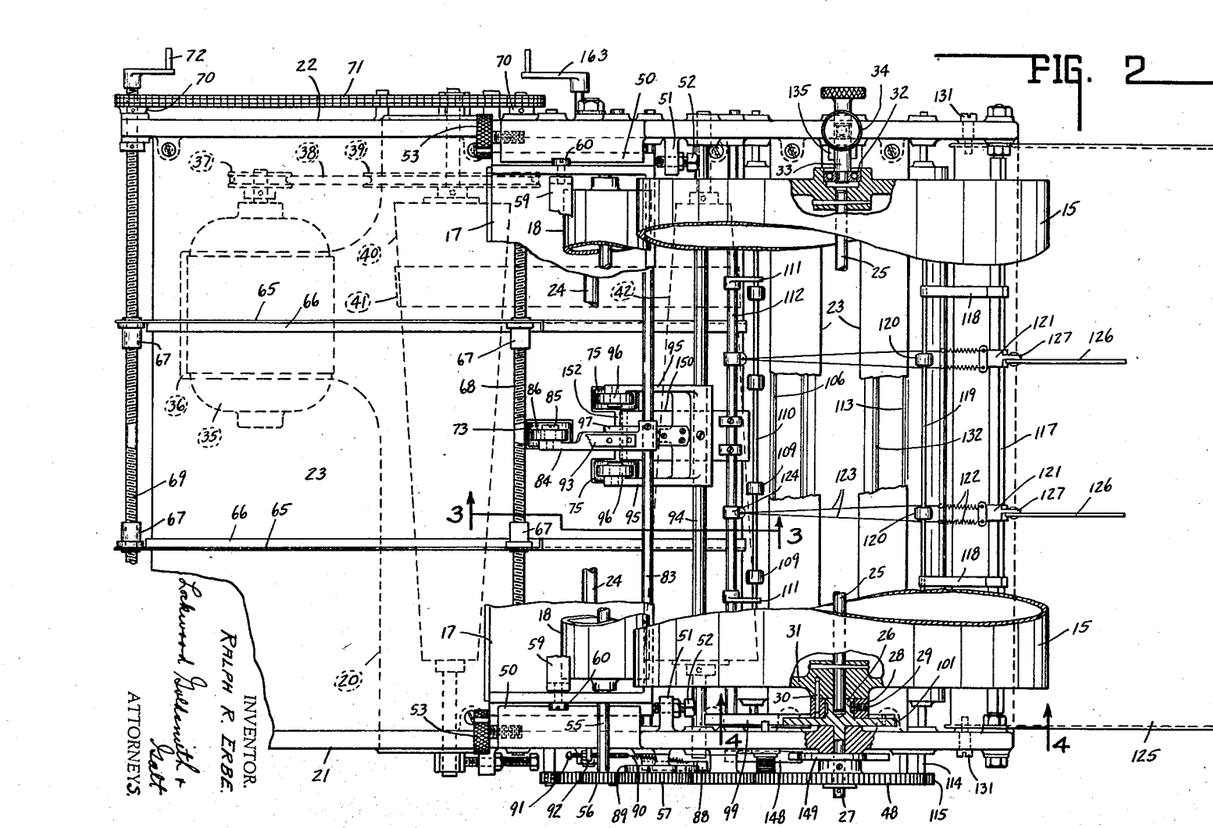
Fig. 2 is a plan view of the same with parts removed and other parts cut away.

For the purpose of placing the sheets in proper lateral relation with respect to the drum 15, there are provided a pair of guides 65 having horizontal flanges 66 which are positioned on the deck plate 23 or slightly above the same and which extend from the left hand end of the machine, referring to Figs. 1 and 2, to a position beneath the drum 15. The said guide members are supported upon threaded bushings 67 which engage threaded shafts 68 and 69. The said shafts are supported on suitable bearings on the side plates 21 and 22 and are right and left hand threaded, as shown in Fig. 2. Thus, the rotation of the shafts causes the bushings 67 and the guide members 65 to approach each other or recede from each other. The shafts 68 and 69 carry sprockets 70 about which there is trained a chain 71 by means of which the two shafts may be rotated in unison. A crank 72 is mounted upon one of the shafts for rotating the same. By this means the spacing of the guide members 65 may be adjusted to suit varying widths of sheets and the sheets, when guided thereby, will always reach the drum 15 in the same lateral relationship.

Beneath the deck plate 23 and projecting through a suitable opening therein there is a roller 73 mounted upon a cross shaft 74. A pair of similar rollers 75 are mounted upon a similar shaft 76. The said rollers are constantly rotated from the gear 47 by a gear train consisting of pinions 77 and 78, gear 79, pinion 80, gear 81 and pinion 82, the pinions 80 and 82 being mounted on the shafts 76 and 74 respectively.

A rock shaft 83 extends transversely across the machine and carries an arm 84 on which there is rotatably mounted, by means of a pivot pin 85, a roller 86, the said roller being positioned directly above the roller 73. One end of the rock shaft 83 carries a lever 87 having an upturned end or finger 88 engaging a cam 89 secured to the gear 57. A tension spring 90 is secured at one end to the lever 87 and at the opposite end to an adjusting screw 91 carried by a pin 92 fixedly mounted upon the tie rod 24. By means of this construction the shaft 83 is periodically rocked under the influence of the cam 89. The arm 84 attached to said shaft is thus raised and lowered to bring the roller 86 into engagement with the roller 73 or with the upper surface of a sheet of paper if one has been inserted by the operator between said rollers.

A resilient finger 93 (partly cut away in Fig. 2 for sake of clearness) is secured to the arm 84 and extends downwardly ahead of the roller 86 to contact with the deck plate 23 or with a sheet of paper thereon when the roller 86 is lowered. The said finger, when in contact with the deck plate, prevents the insertion of a sheet beneath the roll but the tension thereof is so adjusted that it does not interfere with the movement of a sheet already in place.

A second rock shaft 94 extends across the machine and is suitably supported upon the side plates 21 and 22. The said shaft carries a pair of arms 95 on the outer ends of which are rotatably mounted a pair of rollers 96, said rollers being positioned directly above the rollers 75. In addition, there is secured to the rock shaft 94 a resilient finger 97 having a downwardly projecting end or gate 98 engageable with the deck plate 23 between the rollers 96 and slightly ahead of the center line of said rollers. The rock shaft 94 also carries a lever arm 99 having an upturned end or finger 100 engaging a cam 101 formed integrally with the stub shaft 27. The rock shaft 94 is periodically oscillated under the influence of said cam to move the rollers 96 downwardly and upwardly into and out of engagement with the rollers 75 or with a sheet of paper interposed therebetween. At the same time, the gate 98 is raised and lowered to engage the deck plate 23 or to engage the upper surface of a sheet of paper resting thereon.

In the operation of this portion of the mechanism, the operator places a sheet of paper upon the guideways 66. As the finger 88 reaches the elevated portion of cam 89 the roller 86 and finger 93 are raised to permit the operator to slide the paper beneath the edge of the roll 86. When the cam 89 is rotated sufficiently to bring the finger 88 to the root of said cam, the roller 86 drops, engages the paper and draws it forwardly into engagement with the gate 98 since the adjustment of cams 89 and 101 is such that at this time the finger 100 is riding upon the root of said cam and the gate 98 is in contact with the deck plate 23. The adjustment of the spring 90 is such that the pressure exerted by roller 86 upon the paper is sufficient to advance the same to the gate 98 but is not sufficient to prevent slipping of the roller 73 on the under surface of said paper when the paper has been stopped by said gate. The paper in this position is prevented from being crumpled by a sheet 102 of resilient metal which engages the upper surface thereof and which is suitably supported upon the tie rod 24.

As the cam 101 is rotated, the finger 100 reaches a projection 103 thereon causing the gate 98 and the rollers 96 to be momentarily elevated sufficiently to permit the sheet to be pushed beneath the same by roller 73. Immediately after passing the projection 103, the finger 100 moves to the arcuate outer surface 104 of the cam under the influence of a tension spring 105. In this position the rollers 96 are dropped sufficiently to engage the upper surface of the paper and to start the final movement of the sheet beneath the drum 15. It will be seen that the position of the projection 103 which determines the time of raising the gate 98 controls the initiation of final movement of the sheet and since the projection 103 is in a fixed angular relation to the pins 16, the pins will invariably engage corresponding portions of each sheet. The glue spots thereon will, therefore, invariably be in the proper place for the swatch to be applied thereto.

For further aiding the advance of the sheets a roller 106 is positioned beneath the deck plate 23 and projects upwardly through an enlonged opening therein. The said roller is mounted upon a shaft 108 which also carries the pinion 78 and the roller is thus constantly rotated. A number of smaller rollers 109 are positioned directly above the roller 106 on a shaft 110 which is supported on a pair of arms 111 freely mounted upon a shaft 112. The rollers 109, by their weight, serve to press the sheet against the roller 106 and thus assist in the further advancement of the sheets.

For discharging the sheets from the machine after deposition of glue thereon, there is provided an additional roller 113 positioned beyond the edge of the deck plate 23 and having its upper surface substantially at the deck plate level. The said roller is carried on a shaft 114 suitably supported on the side plates 21 and 22 and carrying a pinion 115 at its outer end. An idler pinion 116 meshes with the pinion 115 and with the gear 47 and thus continuously drives the roller 113. A square shaft 117 is adjustably mounted upon the side plates 21 and 22 and has secured thereto a pair of resilient arms 118 supporting a shaft 119. The shaft 119 carries slidably mounted thereon a plurality of small rollers 120 positioned directly above the roller 113. The position of shaft 117 is so adjusted that the resilient arms 118 exert sufficient pressure upon the rollers 120 to press the sheets firmly against the roller 113. The rollers thus are enabled to give to the sheets their final movement for discharging the same from the machine.

Slidably mounted upon the square shaft 117 there are a plurality of small fittings 121 corresponding in number to the rollers 120. Attached to each of the fittings 121 there is a pair of tension springs 122 to each of which there is attached a wire 123. The opposite ends of said wires are attached to hooks 124 which engage the shaft 112. The wires 123 pass beneath the shaft 119 on each side of the rollers 120 and thus serve to retain the rollers in a relatively fixed position upon the said shaft. This position can be so adjusted by sliding the fittings 121 and the hooks 124 that the rollers 120 will not interfere with the glue spots on the sheets. The wires 123 serve the further purpose of preventing the sheets from adhering to the pins 16 and being drawn upwardly thereby. The use of the springs 122 insures a uniform yielding tension upon the wires.

From the rollers 113 the sheets are discharged onto a downwardly sloping apron 125 from which they fall onto the revolving table or conveyor 19. In their movement down the apron 125 the sheets are guided by a plurality of fingers 126 pivotally mounted upon lugs 127 formed upon the fittings 121. The position of the apron 125 is adjusted by means of an arm 128 pivotally secured to the bottom thereof and extending through a lug 129 formed upon the base plate 20. An adjusting nut 130 threadedly engaging the said arm 128 serves to fix the position of the apron. The said apron is pivotally mounted on the side plates 21 and 22 by means of pivot pins 131.

*Sheet back-up mechanism*

Figures 3, 4, 5, 6, 7:
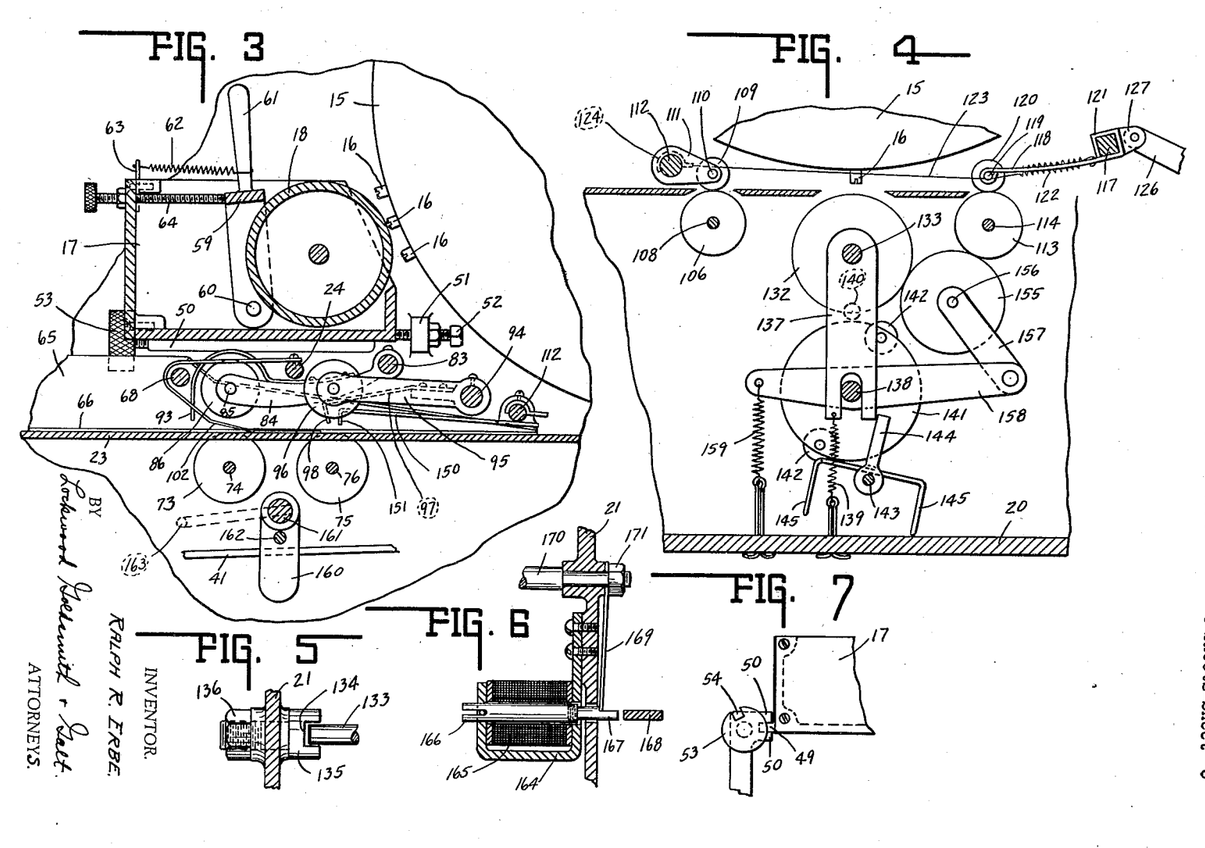
Fig. 3 is a sectional view taken on the line 3—3 of Fig. 2.
Fig. 4 is a similar view taken on the line 4—4 of Fig. 2.
Fig. 5 is a fragmentary sectional view taken on the line 5—5 of Fig. 1.
Fig. 6 is a sectional view taken on the line 6—6 of Fig. 1.
Fig. 7 is a fragmentary end view of a corner of the glue pot showing the mounting thereof.
Figure 8:
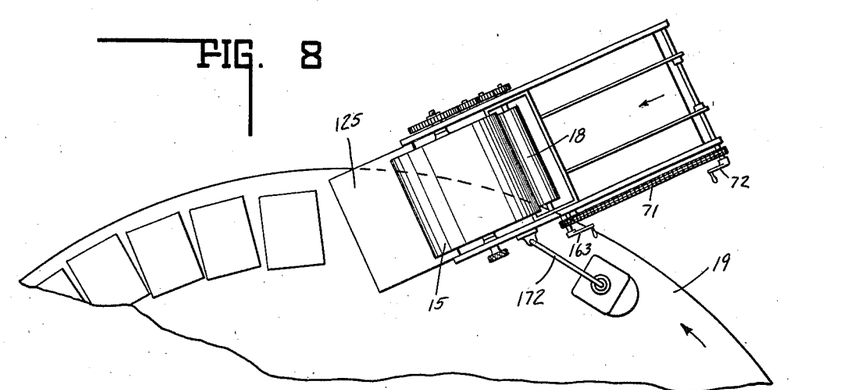
Fig. 8 is a plan view showing the relation of the gluing machine and the off-bearing conveyor.
Figure 9:
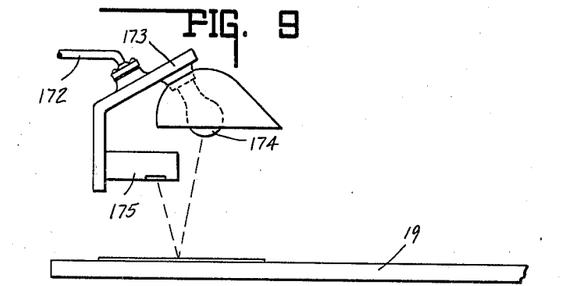
Fig. 9 is an elevational view of an arrangement of a photo-electric cell and lamp for illuminating the same used in the control of operation of the machine.

Directly beneath the drum 15 there is provided a back-up roller 132. The said roller is preferably formed of sponge rubber or other resilient material and serves to support the sheets in a yielding manner during deposition of glue thereon. It is highly important that no glue be deposited on the said roller when the machine is operated without the presence of a sheet. For this purpose the roller 132 is mounted for vertical movement so that it may be lowered away from the drum 15 if no sheet is present in the machine. The roller 132 is mounted upon a shaft 133 each end of which is guided in a vertical slot 134 formed in the face of a guide stud 135. Two of these guide studs are provided, one of which is locked by a lock nut 136 to the side plate 21 and the other is similarly locked to the side plate 22. The shaft 133 is supported at each end by a vertically movable member 137, the lower end of which is forked, as best shown in Fig. 4 and straddles a horizontal shaft 138 extending across the machine. A tension spring 139 is anchored to the base plate 20 at one end and to the member 137 at the opposite end and serves to pull the said member downwardly. A pin 140 is secured to the member 137 and rides on a cam 141 secured to the shaft 138. The gear 46 is keyed to the shaft 138 which, therefore, is constantly rotated. The cam 141 carries a pair of rollers 142 each of which periodically engages the pin 140 to elevate the member 137 and the back-up roller 132. A rock shaft 143 extends transversely across the machine and carries a latch pin 144. When the member 137 is lifted by one of the rollers 142 and at the same time the rock shaft 143 is rocked to the left in Fig. 4, the end of the latch pin 144 is brought beneath the member 137 to maintain the same in its elevated position. The movement of the rock shaft 143 is limited in both directions by a stop member 145 secured to said rock shaft and engaging the base plate 20.

For actuation of the rock shaft 143 there is provided on its outer end an arm 146 to which there is attached a spring 147, the opposite end of which is attached to a finger 148 engaging a cam 149 secured to the gear 46. The finger 148 is mounted upon the rock shaft 112 which also carries a finger 150 having a downwardly extending lip 151 which is movable by oscillation of the shaft 112 into and out of an opening 152 (Fig. 2) in the deck plate 23. A tension spring 153 is anchored at one end to the side plate 21 and at the opposite end to the finger 148.

In the operation of this part of the apparatus, each of the rollers 142 is timed to elevate the back-up roll 132 as the finger 148 rides upon a projection 154 on the cam 149. The finger 148 thus exerts a tension upon the spring 147 to rock the shaft 143 and bring the latch member 144 beneath the member 137. The finger 148 immediately leaves the projection 154, permitting the spring 153 to draw the same to the right in Fig. 1. This movement tends to rock the shaft 112 and to bring the lip 151 downwardly. If at this time a sheet has passed the gate 98, the lip 151 engages the same and is prevented from further downward movement. The tension of the spring 147 is thus preserved to maintain the latch member 144 in position to hold the back-up roller in its elevated position. If, however, no sheet has passed the gate 98 the finger 151 may enter the opening 152 in the deck plate and permit further movement of the finger 148. This movement releases the tension on the spring 147, permitting the latch member 144 to move from beneath the member 137 and permitting the same to be drawn downwardly by the spring 139. To insure movement of the latch member the size and tension of the spring 147 is so chosen that it becomes coil bound when the lip 151 enters the opening 152. The said spring, therefore, exerts a positive pressure tending to force the latch member 144 from its position under member 137. If desired, however, an additional spring may be provided to supply the necessary force.

The back-up roller is frictionally rotated by a roller 155 which is pressed against the same and against the constantly rotated roller 113. The roller 155 is supported on a shaft 156 each end of which is carried on the upper end of an inclined link 157 in turn pivotally mounted on the outer end of a lever 158. The said levers are freely mounted on the shaft 138 and have attached to their opposite ends tension springs 159 anchored to the base plate 20. These springs provide the necessary force for pressing roller 155 against rollers 113 and 132.

From the foregoing, it will be apparent that the back-up roll 132 may be elevated just after the time for introduction of a sheet past the gate 98 and that the said roller will be automatically returned to its lower position if at that time no sheet has in fact passed the gate. The timing may be such that the roller returns to its lower position, if at all, before the pins 16 reach the roller so that no glue can be deposited thereon by said pins. The force necessary for the upward movement of the roller, for setting the latch and for the tripping of the latch to lower the roller, is supplied by other means than the movement of the sheet of paper. The only force exerted on the paper is that required to prevent movement of the rock shaft 112 by spring 147 and this force is applied through a relatively long lever arm.

*Control*

The table 19 is constantly rotated at any desired speed, preferably by an electric motor, not shown. The speed of operation of the gluing machine is varied to correspond to the speed of rotation of the table by means of a belt-shifting device consisting of a yoke 160 straddling the belt 41 and mounted on a threaded shaft 161. The yoke is prevented from rotating with the shaft by a guide rod 162 and thus travels backward or forward along shaft 161 as said shaft is rotated. A crank 163 is mounted on the shaft 161 for rotating the same. Movement of the yoke 160 shifts belt 41 upon the cone pulleys 40 and 42 to adjust the speed of the machine.

In order to prevent delivery of sheets from the gluing machine to the table on top of sheets already in place on the table there is provided the following apparatus:—Mounted on the side plate 21 there is a bracket 164 carrying a magnet coil 165 having an iron or steel plunger 166 slidably mounted therein. The plunger 166 has a non-ferrous extension 167 movable by movement of the plunger into the path of a bridge-like member 168 carried upon the arm 99. A leaf spring 169 is secured to the plate 21 by means of stub shaft 170 and nut 171. Said spring engages a shoulder on the extension 167 and normally urges the same to the left in Fig. 6 to disengage it from the bridge 168. The relative positions of the bridge 168 and plunger 166 are such that said bridge is directly opposite said plunger when the feed roller 96 is engaged with a sheet for feeding the same but is below the plunger when the finger 100 is riding upon the portion 104 of the cam 101. If during this latter period of time the solenoid is energized, the plunger is moved to the right bringing the extension 167 into the path of bridge 168. In this position the bridge is prevented from completing its full travel when finger 100 leaves the portion 104 of the cam and, therefore, the feed roller 96 is prevented from engaging the sheet for feeding the same. If, however, the solenoid is not energized spring 169 maintains the plunger in its normal position and regular feeding of the sheets takes place.

For controlling the operation of the solenoid 165 to stop the feeding of sheets the following apparatus is provided:—Mounted on the side plate 22 there is an adjustable bracket 172 carrying a base 173 on which there is mounted a lamp 174 and a photo-cell 175. The bracket 172 is adjusted to bring the lamp and photo-cell above the path of the sheets on the table 19 just ahead of the gluing machine. The photo-cell and solenoid are connected by wiring, to be hereinafter described, in such manner that when light from the lamp 174 is reflected from a sheet on the table to the photo-cell the solenoid will be energized to stop the feeding of the next sheet to the table. The table itself is covered with a dark material so that insufficient light will be reflected therefrom to operate the solenoid when no sheet is present thereon. The position of the photo-cell is so chosen that the time required for movement of a sheet on the table from beneath the cell to the discharge point of the gluing machine is approximately the same as that required to pass a sheet through the gluing machine. The operation of the photo-cell therefore prevents depositing of a sheet on top of one already on the table but permits the deposition of a sheet in any empty space upon the table. The operation of the gluing machine is thus synchronized with the speed of the operators in removing sheets from the table.

Figure 10:
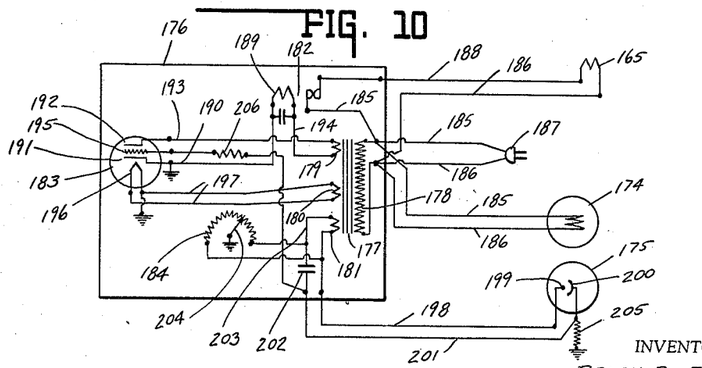
Fig. 10 is a diagram of electric wiring for the control of the machine.

A diagram of the electrical wiring for the photo-cell and solenoid is shown in Fig. 10. In this diagram a relay box mounted at any convenient point on or about the machine is indicated by the reference number 176. Mounted in the relay box there are a transformer 177, having a primary winding 178 and three secondary windings 179, 180 and 181, a normally closed magnetic relay 182, an alternating current amplifying tube 183 and a variable resistor 184. A pair of power mains 185 and 186 are connected by a plug 187 to any suitable source of electric supply such as, for example, a 110 volt alternating current lighting or power circuit. Branches of the power mains 185 and 186 are connected to the primary winding 178 and to the lamp 174 and constantly supply power thereto. A branch of the power main 186 is connected to the solenoid 165 while the opposite terminal of said solenoid is connected through a line 188 and the normally closed contacts of the relay 182 to the power main 185. The solenoid 164 therefore is constantly energized unless the magnet coil 189 of the relay 182 is energized. The said magnet coil is connected in a circuit which includes a grounded conductor 190, the cathode 191 of the amplifying tube 183, the plate 192 of said tube, a conductor 193, the secondary winding 179 and a conductor 194. The current passing through the circuit for energizing the relay magnet depends upon the potential of the grid 195 of the amplifying tube and is so adjusted that when the grid is maintained at substantially zero potential there is sufficient current in the circuit to energize the relay, but if the grid potential is reduced considerably below zero there will be insufficient current to energize the relay.

The heating filament 196 of the tube 183 is constantly supplied with energy from secondary winding 180 by means of conductors 197 one of which is grounded.

The photo-cell 175 is connected in a circuit including the secondary winding 181, a conductor 198, the anode 199 of the photo-cell, the cathode 200 of the photo-cell, a conductor 201, a condenser 202 and a conductor 203. The opposite terminals of the variable resistor 184 are connected to branches of the conductors 198 and 203 and hence said resistor is in parallel across this circuit. The adjustable finger 204 thereof is grounded. The cathode 200 is grounded through a resistance 205. The grid 195 of the tube 183 is connected to the cathode 200 through a resistance 206 and the conductor 201.

In the operation of this apparatus, when there is no sheet in position beneath the photo-cell to reflect light thereon, the current passing through the photo-cell is practically zero. The cathode thereof is then maintained at substantially zero potential since no current passes through the grounding resistance 205. The grid 195 which is connected to the cathode 200 is also at zero potential. The plate current through the amplifier 183 is then sufficient to energize the magnet coil 189 to open the contacts to the relay 182 and deenergize the solenoid 165. When deenergized, the solenoid permits the operation of the gluing machine to deliver a sheet to the rotating conveyor 19. If the operators fail to remove all of the sheets from the conveyor 19 and one of said sheets passes beneath the photo-cell 175, it reflects a certain amount of light thereon sufficient to permit electronic discharge from the anode 199 to the cathode 200 during the half of the alternating current cycle in which the said anode is at a higher potential than the cathode. The path of movement of said electrons is from the cathode 200 through the resistance 205 to ground, thence to the finger 204, through a part of the resistance 184 and back to the anode through the conductor 198. This current flow has the result of depressing the potential of the cathode 200 below zero potential by an amount determined by the current flowing through resistance 205 and the portion of the resistance 184 through which the current must pass. Since the grid 195 is directly connected to the cathode 200, the grid potential is also depressed in the same amount. This depression of the grid potential decreases the plate current through the amplifier 183 sufficiently to deenergize the relay magnet 189 and permit energizing of the solenoid 165. When energized, the said solenoid operates to prevent the gluing machine from supplying a sheet to the rotating conveyor 19.

In the foregoing operation the grid potential for a given amount of light impinging on the poto-cell may be varied by variation of the movable finger 204.

*Alternative operation*

It will be seen in Fig. 1 that the shaft 27 and the shaft 138 rotate at the same number of revolutions per minute since the gears 46 and 48 are of equal size. The cams carried by said shafts are designed to repeat each of their operations twice in a single rotation. Thus, two sheets may be fed through the machine for each rotation of the drum 15. For extra long sheets, however, it is desirable that only one sheet be fed for each rotation of the drum 15. For this purpose there is provided a detachable member 207 which is normally carried for convenience bolted to the cam 101. For operation on the long sheets, the piece 207 is removed and is secured to cam 101 by bolts or screws through holes 208, in which position the outer surface of the member 207 forms a continuation of the outer surface 104 of the cam 101 and thus permits only one operation of the feed roll 96 for each rotation of the drum 15. By this means only one sheet is fed through the apparatus for each rotation even though the operations controlled by the remaining cams take place twice in each rotation.

The foregoing specification describes a preferred form of the invention the details of which may be varied by those skilled in the art without departing from the scope of the invention as defined in the appended claims.

The invention claimed is:

1. In an apparatus of the class described, the combination of a gluing machine through which sheets are passed to deposit glue thereon, a rotating receiving table positioned to receive sheets discharged from said machine, and apparatus responsive to the presence of a sheet at a predetermined point on said table to stop the operation of said machine in proper timed relation to prevent discharge of a second sheet therefrom upon said first sheet.

2. In an apparatus of the class described, the combination of a gluing machine through which sheets are passed to deposit glue thereon, a rotating receiving table positioned to receive sheets discharged from said machine, a photo-cell, a lamp positioned to transmit light to said photo-cell by reflection from a sheet at a predetermined point on said table, and electrical apparatus controlled by said photo-cell when the same is energized by light so reflected to stop the operation of said machine in proper timed relation to prevent deposition of a second sheet upon said first-mentioned sheet.

3. In an apparatus of the class described, the combination of a gluing machine through which sheets are passed to deposit glue thereon, a rotating receiving table positioned to receive sheets discharged from said machine, a feed roller in said machine engageable with a sheet to initiate the movement thereof through the machine, means for moving said feed roller into engagement with said sheet, a solenoid adapted when energized to prevent said movement of the roller, a photo-cell, a lamp positioned to transmit light to said photo-cell by reflection from a sheet at a predetermined point on said table, and electrical connections between said photo-cell and said solenoid by means of which said solenoid is operated to maintain said roller out of engagement with a sheet when said photo-cell is energized by light so reflected, the position of said photo-cell and the speed of operation of said table and said machine being so adjusted that said light-reflecting sheet arrives at the receiving point on said table at substantially the time when a sheet would have been delivered to said table if the movement of said roller had not been prevented.

4. In an apparatus of the class described, the combination of a gluing machine through which sheets are passed to deposit glue thereon, a rotating receiving table positioned to receive sheets discharged from said machine, mechanism in said machine for initiating the feeding of a sheet therethrough at a predetermined time in the cycle of operation, a solenoid operating to render said mechanism inoperable, a photo-cell, a lamp positioned to transmit light to said photo-cell by reflection from a sheet at a predetermined point on the table, and electrical connections between said photo-cell and said solenoid by means of which said solenoid is operated to prevent operation of said feeding mechanism at said predetermined time if light is so reflected, the position of said photo-cell and the speed of operation of said table and said machine being such that said light-reflecting sheet reaches the receiving position on said table at substantially the same time that a sheet would have been deposited thereon if it had been fed to said machine at said predetermined time.

5. In apparatus of the character described, the combination of means for feeding a sheet through the apparatus, a rotatable member engaging said sheet to deposit an adhesive thereon, a stop device for arresting the movement of said sheet at a predetermined point before reaching said rotatable member, mechanism operating said stop device to release said sheet for further movement at a predetermined time in the rotation of said rotatable member, and a second stop device operated to arrest the movement of following sheets when said first stop device is in releasing position.

6. In apparatus of the character described, the combination of means for feeding a sheet through the apparatus, a rotatable member engaging said sheet to deposit an adhesive thereon, a stop device for arresting the movement of said sheet at a predetermined point before reaching said rotatable member, a second stop device for arresting the movement of said sheet before reaching said first device, and mechanism operating said devices to release a sheet from said second device only when said first device is in sheet arresting position and to release a sheet from said first device in timed relation with the movement of said rotating member.

7. In apparatus of the class described, the combination of a rotating member adapted to deposit glue on sheets passing through said apparatus, a feed roller adapted to engage a sheet for starting the travel thereof through the machine, a second feed roller adapted to engage said sheet at a point in its travel beyond said first roller, a stop member positioned to engage a sheet fed by said first roller before reaching said second roller and to prevent further movement thereof under the influence of said first roller, and mechanism operable at a predetermined point in the cycle of operation of said rotary member to move said stop member out of engagement with the sheet and to bring said second feed roller into engagement therewith to initiate the final movement of said sheet through the apparatus.

8. In apparatus of the class described, the combination of a rotating member adapted to deposit glue on sheets passing through said apparatus, a feed roller adapted to engage a sheet for starting the travel thereof through the machine, a second feed roller adapted to engage said sheet at a point in its travel beyond said first roller, a stop member positioned to engage a sheet fed by said first roller before reaching said second roller and to prevent further movement thereof under the influence of said first roller, mechanism operable at a predetermined point in the cycle of operation of said rotary member to move said stop member out of engagement with the sheet and to bring said second feed roller into engagement therewith to initiate the final movement of said sheet through the apparatus, and means engaging the opposite surfaces of a sheet when engaged with said stop member to prevent crumpling thereof by the action of said first feed roller.

9. In a machine of the character described, the combination of a rotatable member adapted to deposit adhesive upon a sheet passing through said machine, a back-up member movable into and out of position for backing up a sheet during deposition of said adhesive, and a latch device arranged when latched to hold the same in back-up position, said device being normally engaged by a sheet and held in latching position thereby, but being free to release said back-up member for movement out of back-up position when not engaged by a sheet.

10. In apparatus of the character described, the combination of a rotatable member adapted to deposit adhesive upon a sheet passing through said apparatus, a back-up member movable into and out of position for backing up a sheet during deposition of said adhesive, a latch device arranged when latched to hold the same in back-up position, a control member for said device normally engaged by a sheet and held in latching position thereby, but being free to release said latch device when not engaged by a sheet, and power-operated mechanism for returning said back-up member to back-up position and for resetting said latch.

11. In apparatus of the class described, the combination of a rotatable member adapted to deposit glue upon one surface of a sheet passing through said apparatus, a back-up member member adapted to engage the opposite surface of said sheet during deposition of glue thereon and movable into and out of backing-up position, a finger engageable with the surface of a sheet at a predetermined point in its travel through said machine, power-operated means for moving said back-up member into back-up position and for bringing said finger into contact with said sheet, a latch adapted when latched to retain said back-up member in back-up position, and control apparatus connecting said finger and latch by means of which said latch is maintained in latched position if said finger engages a sheet but is released to permit return of said back-up member out of back-up position if no sheet is in position to be engaged by said finger.

12. In apparatus of the class described, the combination of a rotatable member adapted to deposit glue upon one surface of a sheet passing through said apparatus, a back-up roller engaging the opposite surface of said sheet during deposition of glue thereon and movable into and out of back-up position, a second roller constantly rotated about a fixed axis, a third roller frictionally engaging said back-up roller and said second roller to transmit rotation to said back-up roller, a movable mounting for said third roller, and means for biasing said mounting to cause movement thereof in the proper direction to maintain contact between said rollers irrespective of the position of said back-up roller.

13. In apparatus of the class described, the combination of a rotatable member adapted to deposit glue upon one surface of a sheet passing through said apparatus, a back-up roller engaging the opposite surface of said sheet during deposition of glue thereon and movable into and out of back-up position, a second roller constantly rotated about a fixed axis, a third roller frictionally engaging said back-up roller and said second roller to transmit rotation to said back-up roller, a pair of levers, links secured to the ends of said levers and pivotally supporting said third roller, and yielding means urging said levers in the proper direction to maintain contact between said rollers independently of the position of said back-up roller.

RALPH R. ERBE.